April 21, 1970 C. F. AULT 3,508,212

SHIFT REGISTER CIRCUIT

Filed Jan. 16, 1968 3 Sheets-Sheet 1

INVENTOR
C. F. AULT
BY [signature]
ATTORNEY

United States Patent Office 3,508,212

Patented Apr. 21, 1970

3,508,212

SHIFT REGISTER CIRCUIT

Cyrus F. Ault, Wheaton, Ill., assignor to Bell Telephone Laboratories, Incorporated, Murray Hill, N.J., a corporation of New York Filed Jan. 16, 1968, Ser. No. 698,256
Int. Cl. G11c 19/00; H03k 23/00
U.S. Cl. 340—173 15 Claims

ABSTRACT OF THE DISCLOSURE

A semiconductor shift register comprised of two parallel banks of flip-flops interconnected by transistor gates is disclosed. Shifting is accomplished by pulsing the collector potential applied to the flip-flops of one bank to gate data into it from the other bank, and vice versa.

BACKGROUND OF THE INVENTION

Field of the invention

This invention relates to temporary storage registers and more particularly to shift registers.

Description of the prior art

The use of shift registers as a means for temporary storage is well known in the data processing field. More specifically, the use of two parallel banks of flip-flops interconnected in such a manner that data is shifted by transferring it back and forth between the banks is known and is sometimes referred to as a "double rank" shift register.

An example of its type of shift register is shown in R. A. Edwards Patent 2,666,575, issued Jan. 19, 1954. The Edwards shift register consists of two banks of tube type flip-flops interconnected by the tube amplifiers. Shifting is accomplished by applying a clear pulse to the bank of flip-flops from which data is to be transferred. The application of the clear pulse results in a potential being developed across choke circuits, included as part of each flip-flop, that are associated with those flip-flops in the set state. The potentials across each of these choke circuits biases an interconnecting amplifier into conduction and these amplifiers transfer the set states to associated flip-flops in the second bank. Once this has been accomplished, the data in the second bank, whose flip-flop circuits are identical to those in the first bank, are transferred back to the first bank by applying a clear pulse to the second bank, and a shift pulse to shift control circuits in the first bank. The second bank of flip-flops respond to the clear pulse in the same manner as those in the first bank and the shift control pulses determine whether the data are shifted to the left or right when transferred back into the first bank.

While the above shift register design is adequate in the tube art, it is inadequate in the semiconductor art where the type and number of components, and the number of circuit interconnections can become crucially important. This is especially true where it is desired to use microelectronic circuit elements efficiently in implementing shift registers. Consequently, it would not be efficient to use the Edwards design if the circuit was to be implemented using integrated circuit elements.

SUMMARY OF THE INVENTION

Applicant's shift register is also a shift register that accomplishes shifting by transferring data between two banks of flip-flops. However, it is a semiconductor shift register designed in such a manner that the number and types of components, and circuit interconnections have been minimized. This not only reduces the cost of the shift register when it is implemented using discrete components, but also greatly increases the efficiency with which microelectronic elements may be used to implement it.

Applicant's shift register includes a data register, a memory register, and a plurality of transistor gates which interconnect selected flip-flops, in the two registers. Both registers are comprised of a plurality of conventional transistor flip-flops, and the transistor gates are used to directly couple the emitters of selected data register flip-flops to the emitters of selected memory register flip-filops and vice versa. Upon the application of the proper signals, data in the data register is gated into the memory register and then gated back into the data register being displaced a desired number of digit positions.

Shifting is accomplished by applying a pulsed power supply potential to each of the registers. The occurrence of the pulses in the two supply potentials are synchronized and they are applied in a selected order.

In the shift register implemented using n-p-n devices, data is transferred from the data register to the memory register by pulsing the memory register collector potential. This clears the memory register flip-flops and enables selected interconnecting transistor gates. Upon the expiration of the pulse, the enabled transistor gates result in the data contained in the data register flip-flops being transferred into associated flip-flops in the memory register. Next, the collector potential of the data register is pulsed, resulting in the clearing of the data register and the enabling of selected interconnecting transistor gates. Upon the expiration of this pulse, the data is transferred from the memory register back into selected data register flip-flops via the enabled gates. These operations constitute one shift cycle and the amount the data shifted is determined by the paths supplied by the memory-to-data register interconnecting gates.

The types and number of components, and the number of interconnections required to implement the shift register have been minimized by utilizing the operational characteristics of semiconductors. For instance, initiating clearing and shifting by merely pulsing collector potential reduces the number of interconnections and components required. the number of resistors required is reduced by using direct coupled transistor gates to interconnect the registers and the need for such elements as the choke circuits in Edwards is eliminated.

One of the advantages of the invention lies in the fact that it uses a minimal number of discrete components to provide a high-speed shift register. Another advantage is that the invention lends itself to implementation using microelectronic circuit elements which, when utilized efficiently, yield very economical circuits.

It is an object of this invention to utilize semiconductor devices to achieve a low cost storage register.

It is another object of this invention to utilize the operating characteristics of semiconductor devices to reduce the number of components and circuit interconnections required to implement a shift register.

It is yet another object of the invention to reduce the number of different types of components required to implement a shift register.

It is a further object of this invention to facilitate the economical implementation of shift registers with microelectronic circuit elements.

It is a still further object of this invention to maximize the efficiency with which integrated circuit elements may be used to fabricate shift registers.

GENERAL DESCRIPTION

Figure 1:
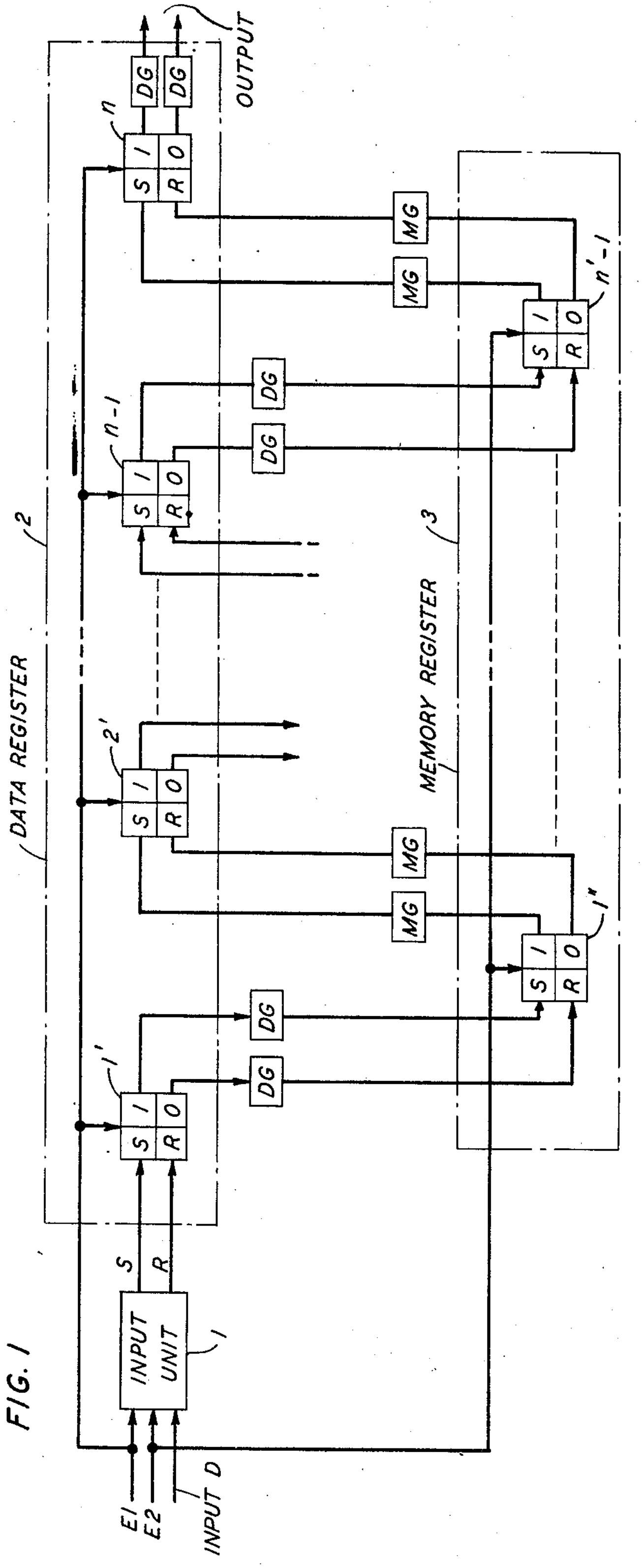
FIG. 1 shows a block diagram of the shift register.
Figure 4:
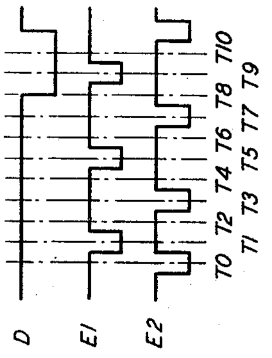
FIG. 4 show a timing diagram of the collector potentials and data applied to the shift register which facilitates the description of the invention.

Referring to FIG. 1, a general block diagram of the shift register shows an input unit 1, a data register 2, a memory register 3 and interconnecting gates DG and MG. A timing diagram for the supply potentials E1, E2 and input data D is shown in FIG. 4. The values these potentials vary between are determined by the type of circuit elements used.

The operation of the shift register may be generally described as follows: When E2 goes low, as shown at T0 in FIG. 4, the flip-flops in the memory register 3 (FIG. 1) are cleared and the signals R and S both go to a "1." This results in each of the gates DG connected to the conducting side of a data register flip-flop becoming conductive. In other words, if the data register contained all "1's" when E2 went low, all of the gates DG connected to the "1" side of the data register flip-flops would conduct. When E2 goes high, the side of each memory register flip-flop connected to a conducting gate DG will conduct. In the all "1's" case the "1" side of each memory register would conduct when E2 went high since each of these sides is connected to a conducting gate DG. Thus, the pulsing of E2 results in the transfer of data from the data register 2 (FIG. 1) to the memory register 3.

Similarly, when E1 is pulsed as is shown at T1 in FIG. 4, the data register is cleared and one of the gates MG (FIG. 1) connecting each memory register flip-flop with a data register flip-flop becomes conductive. Additionally, E1 being low results in either R or S being "0." If the input signal D is a "1," signal S will be a "0" and if D is a "0," the signal R will be a "0." When E1 goes high again, the side of each of the data register flip-flops connected to a conducting gate MG (FIG. 1) will conduct just as was explained above for the memory register. This, in effect, transfers the data from the memory register 3 back into the data register 2. Additionally, the side of the first data register flip-flop whose input from the input unit 1 is "0" will conduct, transferring the current value of the signal D into that flip-flop.

At this point, one shift cycle is complete and, for the illustrative embodiment shown in FIG. 1, the original data has been shifted to the right one digit position with a new digit being shifted into the first flip-flop in data register 2.

Figure 5:
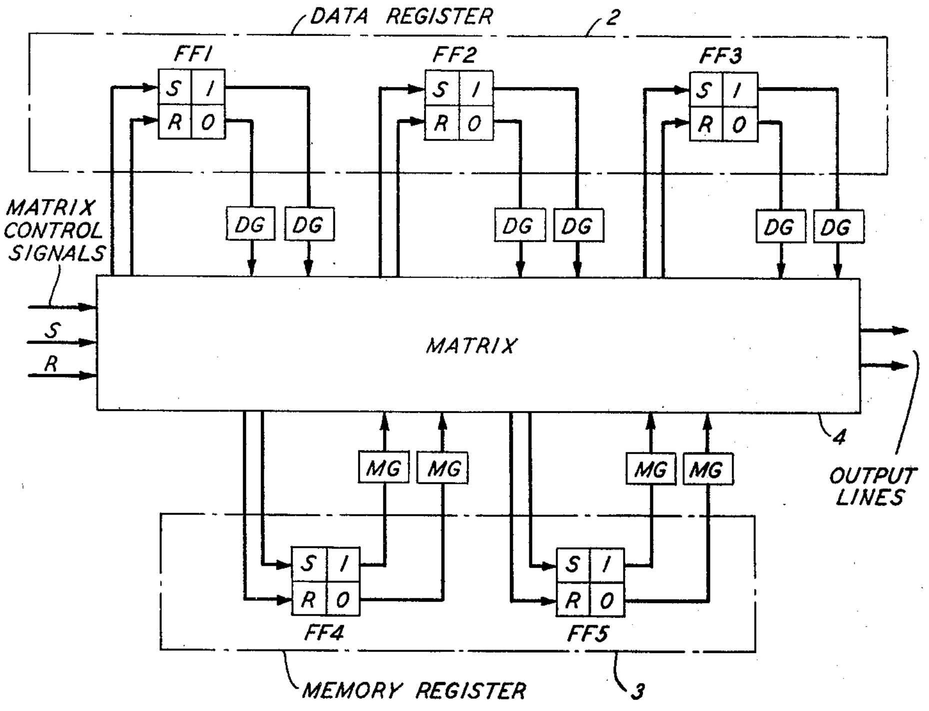
FIG. 5 shows a block diagram of the invention modified to allow varying the direction and the amount of shifting under signal control.

While the shift register shown in FIG. 1 shifts the data to the right one digit positions per shift cycle, it is obvious that it could be readily modified to shift left or to shift more than one digit position per shift cycle by merely modifying the connections between the memory register 3 and the data register 2. Additionally, these alterations could obviously be accomplished under signal control by merely connecting the circuit input and output terminals, and all of the gates DG and MG, by means of a signal responsive switching matrix as shown in FIG. 5.

DETAILED DESCRIPTION

For purposes of describing the detailed operation of the shift register, the conditions shown in the timing diagram of FIG. 4 will be assumed. As was indicated above, E1 and E2 are the pulsed collector potentials applied to the data register 2 and the memory register 3, respectively, and they are also two of the three inputs to the input unit 1 in FIG. 1. The input signal D, as shown in FIG. 4, represents the binary quantity "011" and it is serially applied as the third input to the input unit 1 in FIG. 1. In the detailed description, it will be shown how the serially applied quantity "011" is shifted by the shift register until it occupies the three flip-flop data register shown in FIG. 2.

Figure 3:
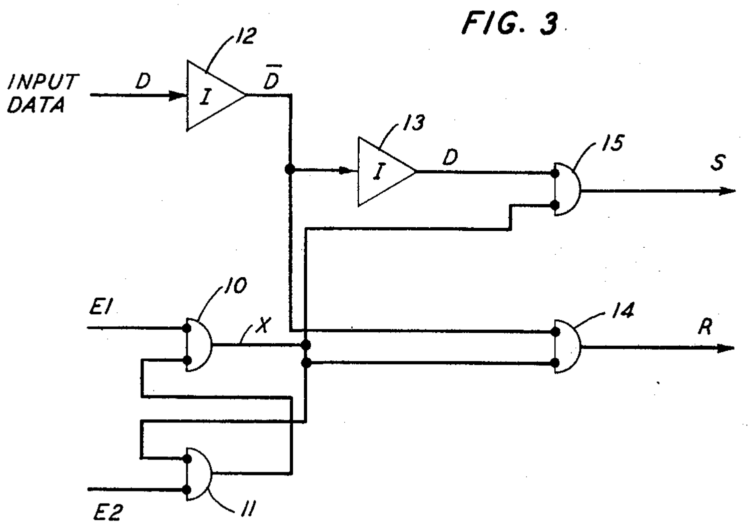
FIG. 3 shows a schematic of the shift register input unit shown in FIG. 1.

At time T1 (FIG. 4) the signals E2 and D are high and E1 is low. These signals are applied to the input unit 1 shown in detail in FIG. 3. The input D being "1" results in the output $\overline{D}$ of inverter 12 being "0" and the output D of inverter 13 being "1." The signal $\overline{D}$ is applied as one input to NAND gate 14 and D is applied as an input to NAND gate 15. It will be recalled that the logical characteristic of a NAND gate is that its output is "1" unless all of its inputs are "1's." It may be thought of as an AND gate followed by an inverter. Simultaneously, the application of E1 and E2 to gates 10 and 11 (FIG. 3) results in the output X of gate 10 being "1." The signal X is applied to both gates 14 and 15. Consequently, at time T1, both inputs to gate 15 are "1" and it is enabled. Gate 14 remains disabled since its $\overline{D}$ input in "0."

Figure 2:
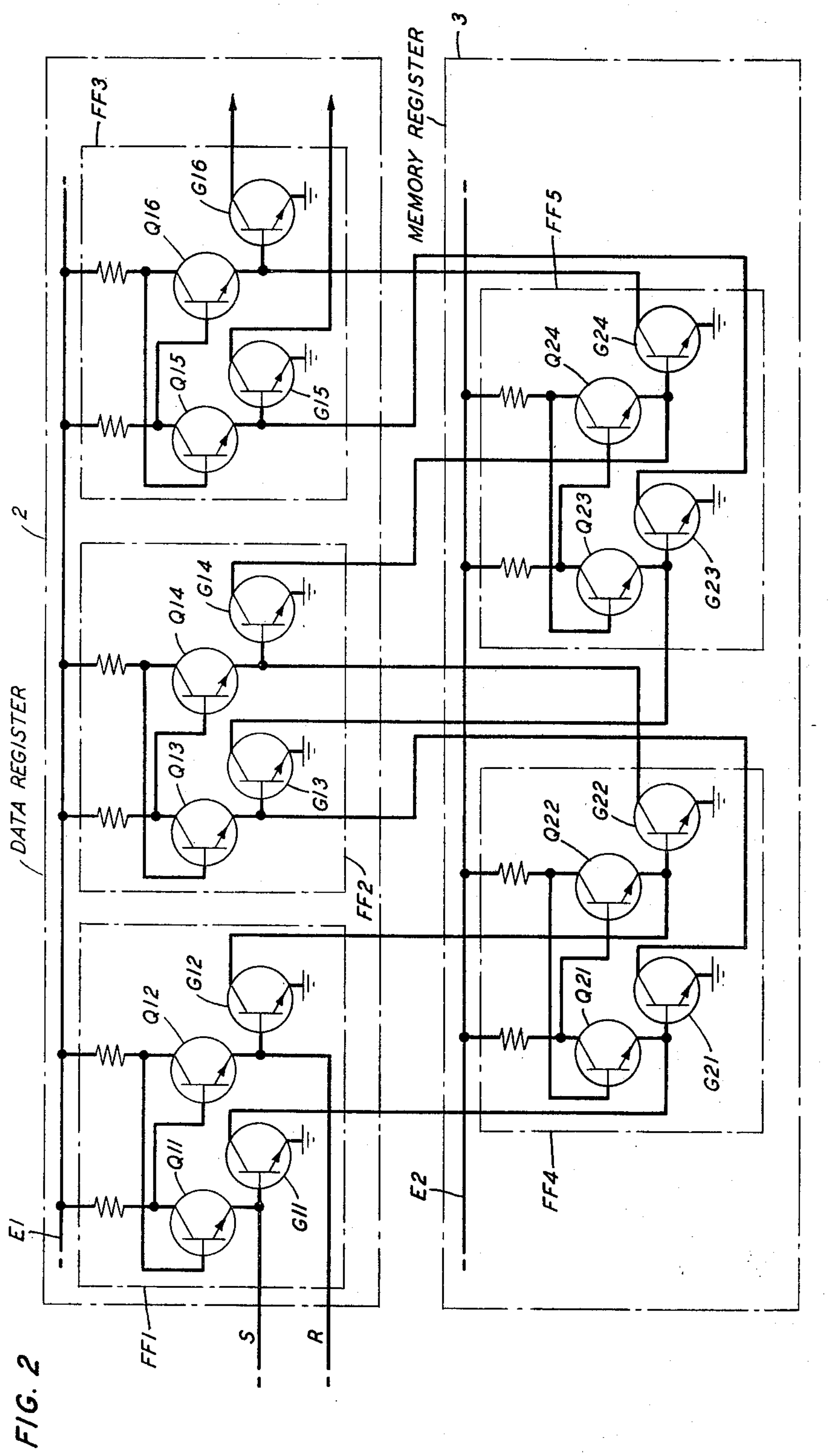
FIG. 2 shows a schematic diagram of the interconnected data and memory registers shown in block diagram form in FIG. 1.

The output S of gate 15 (FIG. 3) is connected to the emitter of Q11 in FF1 of the data register shown in FIG. 2. When gate 15 (FIG. 3) is enabled, it supplies an emitter-to-ground path for Q11. When data register collector potential E1 goes high at T2 (FIG. 4), the transistor Q11 will conduct before Q11 (FIG. 2) due to the ground connection supplied by gate 15 and FF1 is set. This setting of FF1 (FIG. 2) represents the storage of $D=1$ in the data register 2.

At time T3 (FIG. 4) E2 goes low and E1 and D remain high. This results in the memory register flip-flops (FIG. 2) being cleared and the "1" in FF1 being ultimately transferred into FF4 of the memory register. When E2 goes low at T3, the output X of gate 10 (FIG. 3) goes to "0" and this results in gate 15 being disabled. As a result of gate 15 being disabled, Q11 (FIG. 2) loses this path to ground and begins to conduct through gate G11. When E2 goes high at time T4 (FIG. 4), the transistor Q21 of FF4 in the memory register will conduct before Q22 due to the state of G11. This represents the transferral of the "1" in FF1 of the data register 2 to FF4 of the memory register 3.

When E2 goes high at T4 (FIG. 4), the states of E1, E2 and D are all high. The condition continues to exist until T5 (FIG. 4) when E1 again goes low. This clears the data register 2 (FIG. 2) and results in gate 15 in the input unit (FIG. 3) being enabled again in the same manner as when the first "1" was read into the FF1 of the data register. When E1 goes high at T6 (FIG. 4), the second "1" in the quantity "011" is transferred into FF1 (FIG. 2). This is represented by Q11 conducting through gate 15 (FIG. 3) just as it did above for the first "1".

In addition to the second "1" being stored in FF1 (FIG. 4) at T6, the first "1," which is stored in FF4 of the memory register 2 (FIG. 2) at this time, is transferred to FF2 of the data register. In other words, at T6, the first "1" is shifted right one digit position in the data register. This is accomplished in the following manner: When E1 goes low at T5 (FIG. 4), gate G11 (FIG. 2), which was enabled to transfer the first "1" into FF4 by providing a ground for the emitter of Q21, is disabled. The transistor Q21 (FIG. 2) thereupon begins to conduct through gate G21 in the memory register. When E1 goes high at T6, Q13 of FF2 in the data register 2 (FIG. 2) will conduct due to the path to ground through G21. In this manner, the first "1" to enter the data register 2 (FIG. 2) is shifted to the right one position in that register.

At time T7 (FIG. 4), E2 is pulsed again and this results in the "1's" in flip-flops FF1 and FF2 of the data register 2 (FIG. 2) being transferred to flip-flops FF4 and FF5 of the memory register 3 via gates G11 and G13, respectively. The operation of G11 during this transfer is the same as was described above for the transfer of the first "1." Gate G13 is enabled as a result of G21 being disabled when E2 goes low. When gate G21 is disabled, Q13 in the data register, which is in a conductive state, conducts through G13. Consequently, when E2 goes high at time T8, transistors Q21 and Q23 in the memory register 3 will conduct storing the "1's" in data register flip-flops FF1 and FF2 (FIG. 2) in memory register flip-flops FF4 and FF5 respectively.

The above discussion has shown how the two "1's" in the quantity "011" are applied to and shifted by the shift register in FIG. 2. During the first shift cycle, E1 and E2 are pulsed resulting in the first "1" being stored in FF1 of the data register 2 (FIG. 2) and then being transferred to FF4 in the memory register 3. During the second shift cycle, the second "1" is stored in FF1 of the data register 2, the first "1" is transferred from the memory register FF4 to data register FF2 and both of these "1's" are transferred into flip-flops FF4 and FF5 of the memory register.

Returning to FIG. 4, the signal D goes low at T8 representing the "0" in the quantity "011" being shifted into the shift register in FIG. 2. I will be noted that at time T9, E1 is low, E2 is high and D is low. This combination of signal values results in gate 14 in the input unit (FIG. 3) being enabled. E2 being high and E1 being low results in X being "1." Similarly, when D is "0," $\overline{D}$ is "1," making both inputs to gate 14 logical "1's".

When E1 goes high at T10 (FIG. 4), gate 14 remains enabled and supplies a ground for the emitter of Q12 in FF1 of the data register 2 (FIG. 2). Consequently, Q12 conducts and the $D=0$ condition is stored in FF1. Additionally, E1 going low at T9 disables gates G11 and G13 in the data register 2. This results in Q21 and Q23 of flip-flops FF4 and FF5 conducting through gates G21 and G23, respectively. It will be recalled that these memory register flip-flops contain the two "1's" begin shifted through the shift register. At T10, when E1 goes high, Q13 and Q15 of flip-flop FF2 and FF3 will conduct through gates G21 and G23 respectively and the "1's" will again be stored in the data register. At this point the data register 2 (FIG. 2) contains the quality "011." If the shifting were to continue, E2 begin pulsed again would result in the "0" in FF1 being transferred into memory register flip-flop FF4 via gate G12 and the "1" in FF2 of the data register would be transferred into FF5 of the memory register. This would complete the third shift cycle.

The above has shown in detail how the serially applied quantity "011" is introduced into the shift register, one digit per shift cycle, and shifted through the register one digit position per shift cycle by alternately pulsing the collector potentials applied to the data register and the memory register. Although the detailed description involved only a three-digit shift register, it is clear that an $n$ bit shift register, such as the one shown in FIG. 1, may be obtained by merely increasing the size of the shift register shown in FIG. 2 by $n-3$ stages. The three-bit shift register was used as an illustrative example because its description avoids the redundancy inherent in the description of a larger register and still provides a complete disclosure of the concepts embodied in the invention.

With regard to the embodiment shown in FIG. 5, assume a one-bit matrix control signal, where the signal being a "1" connects the registers 2 and 3 as shown in FIG. 2 and a "0" connects the register to shift right two digit positions. When the signal is a "1" the operation of the shift register is as described above. That is, when the "1" is applied to the matrix 4 it results in the R and S inputs being applied to the emitters of FF1 and the output of FF3 being connected to the output terminals. Additionally, the matrix will connect the outputs of FF1 and FF2 as the inputs to FF4 and FF5, respectively. The outputs of FF4 and FF5 will be connected as the inputs to FF2 and FF3, respectively.

When the matrix control signal is "0," the matrix will connect the output of FF4 as the input to FF3. This connection will result in the contents of FF1 being transferred to FF3 in one shift cycle and provides a right shift of two digit positions. The operation of the circuit remains the same as described above with the exception of the interconnecting paths being changed.

Similarly, it is clear that the direction of shifting could be controlled by using a matrix control signal which results in the matrix connecting inputs R and S as inputs to FF3; the output of FF1 to the output terminals; and reversing the interconnections between the registers 2 and 3 to provide a left shift. In this case, the matrix would connect the output of FF3 as the input to FF5, the output of FF5 as the input to FF2, the output of FF2 is the input to FF4, et cetera. Consequently, incoming data signals on the R and S terminals would be applied to FF3 and shifted left one position each shift cycle. The output would be taken from FF1 and felt on the output lines (FIG. 5).

Clearly, a matrix control signal consisting of two bits can be used to control the matrix interconnections to provide a combination of the above shifting operations. For instance, one two-bit configuration of the signal could result in the matrix 4 interconnecting the registers 2 and 3 to shift right one position, another configuration could result in a shift left one position, yet another configuration could result in a left shift of two positions, et cetera.

The above description has shown that by using a signal controlled matrix to interconnect the registers 2 and 3 in applicant's shift register, it is possible to vary both the direction and the amount of shifting that occurs during a shift cycle. This version of the shift register would be especially useful in the electronic computer field.

In summary, the above discussion clearly illustrates the operation of applicant's low-cost shift register whose design lends itself to efficient implementation using either discrete or microelectronic semiconductor devices. Cost has been minimized by eliminating the use of expensive passive components, reducing the overall number of components used, and by reducing the number of circuit interconnections. Since the latter becomes a crucially important factor where microelectronic devices are concerned, the shift register is especially useful in the microelectronic devices art.

The above-described arrangements are merely illustrative of the various arrangements which could constitute applications of the principles of the invention. Clearly, other applications and modifications of the illustrative embodiments, which depart neither from the spirit nor scope of the invention, will be obvious to those skilled in the art as a result of applicant's disclosure.

What is claimed is:

1. In combination;

a data register;

a memory register;

two alternately pulsed potentials each of which is connected to one of said registers as a supply potential; and a plurality of grounded emitter transistor gates directly interconnecting said registers;

wherein a portion of said plurality of gates are responsive to pulses in one of said pulsed potentials and another portion of said plurality of gates are responsive to pulses in the other of said pulsed potentials for transferring data between said registers.

2. The combination of claim 1 wherein said data and memory registers are comprised of a first and a second plurality of flip-flops; and said portion of said plurality of gates responsive to pulses in said one potential have their bases connected to the emitter terminals of selected flip-flops in said data register and have their collectors connected to the emitter terminals of selected flip-flops in said memory register; and said portion of said plurality of gates responsive to pulses in said other potential have their bases connected to the emitter terminals of selected flip-flops in said memory register and have their collectors connected to the emitter terminals of selected flip-flops in said data register.

3. In combination;

two alternately pulsed potentials;

a data register comprised of a plurality of bistable semiconductor circuits;

a memory register comprised of a plurality of bistable semiconductor circuits;

means connecting one of said pulsed potentials to selected terminals of said bistable circuits in said data register as a supply potential;

means connecting the other of said pulsed potentials to selected terminals of said bistable circuits in said memory register as a supply potential; and a plurality of semiconductor gates directly coupling selected like bistable circuit terminals in said data register and said memory register for providing data transfer paths between said registers;

where selected ones of said plurality of gates are enabled upon the occurrence of selected combinations of values of said alternately pulsed potentials.

4. The combination of claim 3 further comprising an input means responsive to the occurrence of selected combination of values of said alternately pulsed potentials for introducing input signals into said data register.

5. The combination of claim 4 wherein said input means responds to the combination of a low value of said pulsed potential applied to said data register, a high value of said pulsed potential applied to said memory register and an input signal level to supply a constant reference potential to a selected terminal of the first bistable circuit in said data register.

6. The combination of claim 5 wherein said input means continues to apply said reference potential to said selected terminal until said pulsed potential applied to said memory register goes to a low value.

7. A storage unit comprising:

two alternately pulsed potentials varying between a selected high value and a selected low value;

an input means for introducing serially applied input signals into said storage unit;

a first bank of semiconductor flip-flops;

a second bank of semiconductor flip-flops;

means for connecting selected output signals of said input means to each of the emitter terminals of the first flip-flop in said first bank;

means connecting each of said alternately pulsed potentials to one of said banks of flip-flops as a collector potential;

a plurality of transistor gates directly coupling the emitter terminals of selected flip-flops in one of said banks to the emitter terminals of selected flip-flops in the other said bank for transferring data between said banks;

wherein both said input means and said plurality of transistor gates are responsive to selected combinations of values occurring in said alternately pulsed potentials.

8. The storage unit of claim 7 wherein a first portion of said plurality of transistor gates are responsive to a low value of the pulsed potential applied to said second bank of flip-flops for transferring the states of selected first bank flip-flops to a selected second bank flip-flops; and a second portion of said plurality of said transistor gates is responsive to a low value of the pulsed potential applied to said first bank of flip-flops for transferring the state of each second bank flip-flop to a selected first bank flip-flop.

9. A shift register comprising:

two alternately pulsed supply potentials;

a first bank of flip-flops;

a second bank of flip-flops;

means for connecting each of pulsed supply potentials to one of said banks of flip-flops as a collector potential;

a first plurality of grounded emitter transistor gates directly connecting the emitter terminals of selected ones of the flip-flops in said first bank to the emitter terminals of selected flip-flops in said second bank;

a second plurality of grounded emitter transistor gates directly connecting the emitter terminals of each of said flip-flops in said second bank to the emitter terminals of selected flip-flops in said first bank;

selected ones of said first plurality of gates being responsive to the pulsing of said pulsed potential applied to said second bank for transferring data from said first bank to said second bank and selected ones of said second plurality of gates being responsive to the pulsing of said pulsed potential applied to said first bank for transferring data from said second bank to said first bank.

10. The shift register of claim 9 wherein selected ones of the transistors in said first plurality of grounded emitter transistor gates each has its base directly coupled to the emitter of a selected flip-flop in said first bank and its collector directly coupled to the emitter of a selected flip-flop in said second bank; and each of the transistors in said second plurality of grounded emitter transistor gates has its base directly connected to the emitter of a selected flip-flop in said second bank and its collector directly connected to the emitter of a selected flip-flop in said first bank.

11. The shift register of claim 9 further comprising: means responsive to the pulsing of said pulsed supply potential applied to said first bank of flip-flops, and the level of an input signal for supplying a ground reference potential to a selected one of the emitters of the first flip-flop in said first bank.

12. In combination:

two alternatively pulsed potentials;

a data register comprised of a plurality of bistable semiconductor circuits;

a memory register comprised of a plurality of bistable semiconductor circuits;

means connecting one of said pulsed potentials to selected terminals of said bistable circuits in said data register as a supply potential;

means connecting the other of said pulsed potentials to selected terminals of said bistable circuits in said memory register as a supply potential;

a signal controlled switching matrix connected to the input terminals of each of said bistable circuits in both said data register and said memory register;

a first plurality of semiconductor gates connecting selected terminals of said bistable circuits in said data register to said matrix; and a second plurality of semiconductor gates connecting selected terminals of said bistable circuits in said memory register to said matrix;

wherein said matrix is responsive to applied control signals for connecting selected ones of said first plurality of semiconductor gates to the input terminals of selected ones of said bistable circuits in said memory register; and connecting selected ones of said second plurality of gates to the input terminals of selected ones of said bistable circuits in said data register.

13. The combination of claim 12 further comprising;

input signals connected to said matrix; and output lines connected to said matrix;

wherein said matrix is responsive to selected ones of said control signals for connecting said input signals to the input terminals of a selected one of said bistable circuits in said data register; and connecting the output lines to a second selected bistable circuit in said data register.

14. A double-rank shift register comprising;
a first plurality of semiconductor bistable circuits energized from a first voltage supply;
a second plurality of semiconductor bistable circuits energized from a second voltage supply;
coupling means comprising direct-coupled transistor circuits interconnecting each bistable circuit of said first plurality to a selected bistable circuit of said second plurality; and
means for alternately pulsing said first and second voltage supplies.

15. the double-rank shift register according to claim 14 further comprising: switching means for selectively altering the interconnections of said coupling means.

References Cited

UNITED STATES PATENTS 2,666,575 1/1954 Edwards ------------ 328—37

TERRELL W. FEARS, Primary Examiner

U.S. Cl. X.R.

307—221, 224; 340—172.5